UNITED STATES PATENT OFFICE.

ALBERT LANG, OF KARLSRUHE, GERMANY, ASSIGNOR TO HANS FREIHEN VON SELDENECK, OF FRANKFORT-ON-THE-MAIN, GERMANY.

PROTECTING IRON FROM RUST.

1,082,161. Specification of Letters Patent. Patented Dec. 23, 1913.

No Drawing. Application filed September 20, 1909. Serial No. 518,656.

*To all whom it may concern:*

Be it known that I, Prof. ALBERT LANG, doctor of philosophy, chemist, a subject of the German Emperor, and resident of Karlsruhe, in the Grand Duchy of Baden, Germany, with the post-office address Weberstrasse 7<sup>b</sup>, have invented new and useful Improvements in Protecting Iron from Rust, of which the following is a specification.

It has been usual for some time past to produce on iron and steel a layer of an oxid to prevent rust, or to produce on iron and steel articles a layer of sulfid of iron for the same purpose. But in order at the same time to give a uniform color and a marketable appearance to the object in question, when applying any of the known processes, it is necessary to use very high temperatures so that the sulfur may burn in or that the chemicals used for oxidation may act. Often the latter are applied in the molten condition from the start. These various processes have the disadvantage that they can only be used when dealing with small articles, since large parts of bridges and the like cannot of course be placed in an oven nor can sulfur compounds and the like to be burnt into them. If, however, it is desired to avoid heating to red heat, as is necessary for example when browning gun barrels, which are damaged by such a high temperature, extremely tedious processes are necessary in order gradually to obtain a uniform coloring.

The present invention purposes to dye permanently iron and steel by means of dyestuffs stable to acids and alkalis, such dyestuffs forming superficial chemical combinations with the metal previously prepared. Among suitable dyestuffs are some anilin dyes, such as anilin black and the so-called sulfurized dyestuffs. The iron is first coated with an oxid layer without the action of high temperatures, by treating it with an iron salt, such as a solution of ferric chlorid, the oxid being produced by the reduction of the salt by the metallic iron. The chemical equation for the re-action is as follows:—

$$Fe_2Cl_6 + 4Fe + 4H_2O = 3FeCl_2 + Fe_3O_4 + 8H.$$

To the solution of the iron salt is added an anilin salt soluble in water, for instance anilin sulfate which becomes intimately mixed in the oxid layer, and gives rise to the formation of color by oxidation with chromic acid, for example. The anilin black thus produced forms a strongly adhering color lake with the layer of oxid. Another mode is to immerse the iron in a solution of an iron salt and then in a chromic acid solution, or the cleansed iron is dipped in a chromic acid solution, dried and immersed in a mixture of anilin and linseed oil. The anilin is oxidized by the chromic acid and forms anilin black, which constitutes with the linseed oil a strongly adherent varnish. The iron may also be converted superficially into iron sulfid by treatment with certain metallic sulfids, which easily part with their sulfur, as for example aluminium sulfid, or magnesium sulfid; thus the finely powdered metallic sulfid may be mixed with an oil or with water, and applied with a brush. The mixture of the sulfid with the moisture contained in the atmospheric air causes the setting free of sulfureted hydrogen, which acts on the iron and whatever rust already adheres thereto in such a manner as to produce iron sulfid. Moreover, the sulfureted hydrogen forms a mixture with the metallic sulfid and with the hydrocarbon, viz., the oil, which is preferably paraffin oil. Of course, it is assumed that the binding medium contains a certain amount of water. The surface so converted can now be colored with anilin or other organic dyestuffs. By warming the above mentioned metallic sulfid, when mixed with a base producing a dyestuff, a so-called sulfurized dyestuff is obtained which is especially fast and permanent. The coloring also forms a very good protection against rust. In all these cases, in contradistinction to previous processes, it is unnecessary to burn in the reagent or to heat the iron or steel objects to redness. The present process is therefore much simpler than those already known and is applicable to all cases, even to bridges and large objects which are already set up.

Instead of treating the metal with the agents in succession, the chemicals named may be compounded to a liquid mixture and the iron painted therewith. An example of such a mixture, which may serve as a paint is aluminium sulfid as powder mixed with anilin and linseed oil, and with an anilin salt dissolved in anilin. In applying this composition to the objects to be treated, it must be appropriately thinned out by means of alcohol or other suitable solvent, so that the linseed oil will not prevent or retard, to any appreciable extent, the chemical reaction.

It only remains to be mentioned that methods similar to the present for oxidizing and coloring aluminium are already known, but in this case the procedure is quite different. The oxidation of the aluminium is only started by corroding with alkalids, acids and salts, such as chlorids, the oxidation continuing spontaneously by action of the oxygen of the air or by the decomposition of water, whereby gradually the whole mass of the aluminium crumbles away, whereas in the foregoing artificial oxidation of the iron, the layer of oxid prevents the iron under it from further oxidation. On the other hand in order to prevent the further oxidation of the aluminium, the artificial layer of oxid must be fixed by heating to redness, so that in this case the same conditions prevail as in the previously known processes for preventing rust by oxidation. In the present process, heating to redness is obviated and uniform coloring is brought about by mixing with the oxid layer or iron sulfid layer such dyestuffs as are brought into action by purely chemical reduction or oxidation.

Having thus described my invention and the best means I know of carrying the same into practical effect, I claim:—

1. A method of coloring iron and steel to prevent the formation of rust, which consists in the artificial chemical alteration of the surface to be treated, attended by the chemical combination, with an anilin dyeing agent, of the surface so altered.

2. A method of coloring iron and steel to prevent the formation of rust, which consists in the production of an artificial chemical alteration of the surface to be treated, and then chemically combining such surface with an anilin dyeing agent.

3. A method of coloring iron and steel to prevent the formation of rust, which consists in artificially producing a layer of iron compound on the surface to be treated, and then applying to such layer an anilin dyeing agent which combines chemically with such layer.

4. A method of coloring iron and steel to prevent rust, which consists in artificially forming a layer of iron oxid on the surface of the metal to be treated, and then chemically combining such layer with an anilin dyeing agent.

5. A method of coloring iron and steel to prevent rust, which consists in artificially producing a layer of iron oxid on the surface of the metal to be treated, and then applying to such layer an anilin dyeing agent.

6. A metallic object having a non-rusting protective coating formed of an anilin-dyed iron compound.

7. A metallic object containing iron and having a non-rusting protective coating formed of a superficial layer of anilin-dyed iron oxid.

8. A metallic object having a chemically altered surface combined with an anilin dyeing agent to form a rust-proof color lake.

In testimony, that I claim the foregoing as my invention, I have signed my name in presence of two witnesses, this seventh day of September 1909.

PROFESSOR ALBERT LANG.

Witnesses:
   HERMANN WALTER,
   AUGUST OOSTERMAN.